S. F. HORVÁTH.
BREAD KNIFE.
APPLICATION FILED FEB. 21, 1920.

1,342,383.

Patented June 1, 1920.
2 SHEETS—SHEET 1.

Inventor
Steven F. Horváth
By Victor J. Evans
Attorney

S. F. HORVATH.
BREAD KNIFE.
APPLICATION FILED FEB. 21, 1920.
1,342,383.
Patented June 1, 1920.
2 SHEETS—SHEET 2.
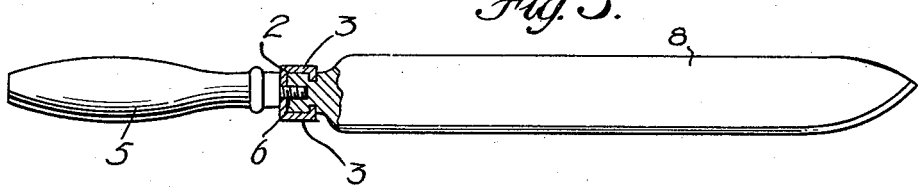
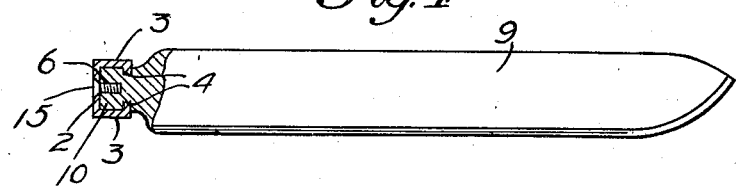
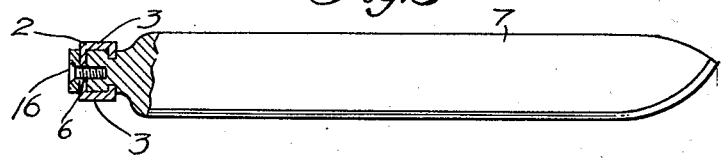
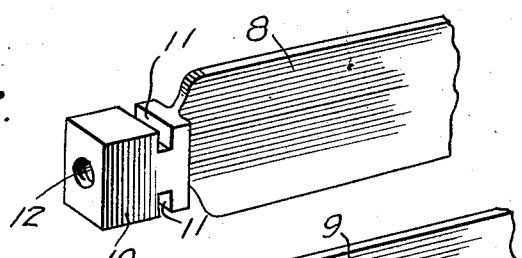
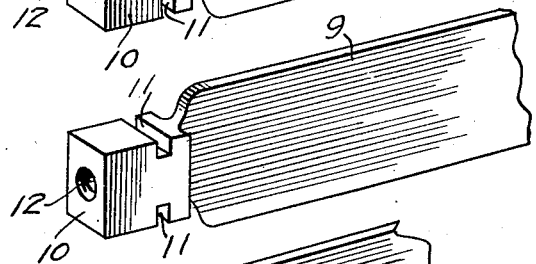
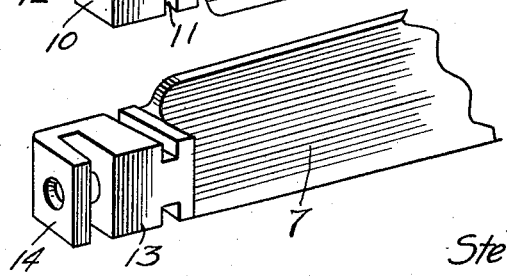
Inventor
Steven F. Horváth
By Victor J. Evans
Attorney

UNITED STATES PATENT OFFICE.

STEVEN F. HORVÁTH, OF BUFFALO, NEW YORK.

BREAD-KNIFE.

1,342,383.  Specification of Letters Patent.  Patented June 1, 1920.

Application filed February 21, 1920. Serial No. 360,285.

*To all whom it may concern:*

Be it known that I, STEVEN F. HORVÁTH, citizen of the United States, residing at Buffalo, in the county of Erie and State of New York, have invented new and useful Improvements in Bread-Knives, of which the following is a specification.

The object of my present invention is the provision of a multiple blade knife for cutting bread, meat loaves and pieces of meat in which there are no bones; the knife being peculiarly advantageous in that some of the blades are capable of being expeditiously and easily removed and as readily replaced, and are also capable of being positioned at different distances apart according to the thickness of the slices to be produced on one operation of the knife.

To the attainment of the foregoing, the invention consists in the improvement as hereinafter described and definitely claimed.

In the accompanying drawings, hereby made a part hereof:

Fig. 3 is a longitudinal vertical section of the knife taken in the plane of the knife handle and the blade in alinement therewith.

Fig. 4 is a longitudinal section taken in a plane parallel to that of Fig. 3.

Fig. 5 is an enlarged transverse section taken in the plane indicated by the line 5—5 in Fig. 1.

Fig. 6 is an enlarged detail view of the central blade of the knife.

Fig. 7 is a similar view of one of the intermediate blades of the knife.

Fig. 8 is a similar view of one of the side blades of the knife.

Similar numerals of reference designate corresponding parts in all of the views of the drawings.

Figure 1:
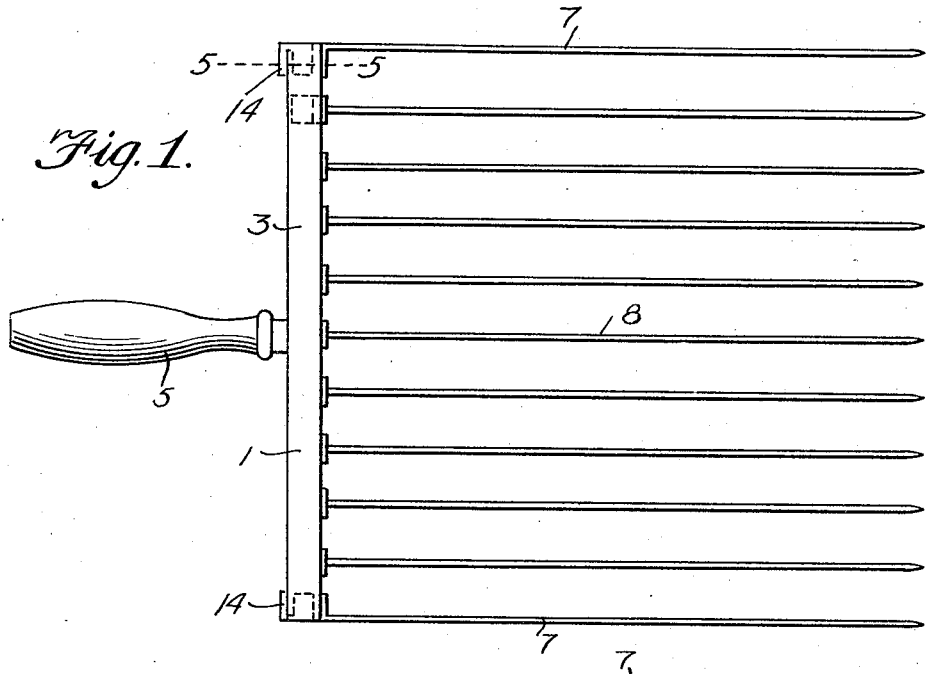
Figure 1 is a plan view illustrating my novel knife with all of its blades in position for use.
Figure 2:
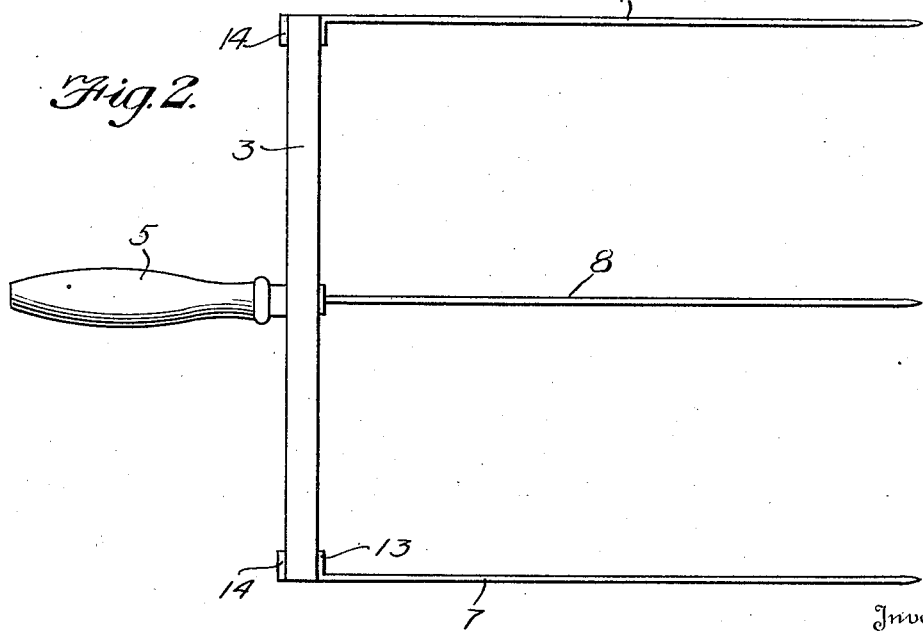
Fig. 2 is a similar view of the knife with all but three of its blades removed, as when it is desired to cut pieces of meat or meat loaves into portions of predetermined size.

Among other elements my novel knife comprises a body 1 that is formed of metal, and includes a back wall 3, forwardly reaching flanges 3 on the upper and lower edges thereof and opposed flanges 4 that reach from the forward edges of the flanges 3 and are arranged in alinement, as appears in Figs. 3 and 4.

Fixed to and extending rearwardly from the back wall 2 of the body 1, is a handle 5, and formed in the said wall 2 is a plurality of apertures 6, greater in number than the blades of the knife.

Engaged in the manner shown with and extending from the ends of the body 1, are the side blades 7, and fixed to the center of the body 1, and also fixed to the back wall 2 thereof and the handle 5 is the central blade 8.

Intermediate of the side blades 7 and the central blade 8 are what may be properly denominated intermediate blades 9 each of which is susceptible of being readily removed and as readily replaced when occasion demands. Each of the said intermediate blades 9 is provided with a thick and heavy heel portion 10, and in each heel portion 10 are upper and lower notches 11 to snugly receive the body flanges 4. It will also be observed that each heel portion 10 is shaped to snugly fit and occupy the space between the back wall 2 and the flanges 3, and that each heel portion is provided in its rear end with a threaded socket 12. It will further be observed that each side blade 7 is provided with an inwardly directed lug 13 shaped in cross-section correspondingly to the body 1, and disposed in the said body 1, and that each side blade has an end flange 14 that laps the rear side of the body 1.

The intermediate blades 9 are connected to the body 1 through the medium of individual screws 15, and the side blades 7 are connected to the body 1 through the medium of individual screws 16; the said screws 16 being larger than the screws 15, and being passed through the flanges 14 and the back wall 2 of the body and into the threaded sockets in the lugs 13. I would also have it understood that I prefer to have the heads of all of the screws referred to countersunk as illustrated, so as to enhance the finished appearance of the knife as a whole.

It will be apparent from the foregoing, that in the practical use of my novel knife the side blades 7 are susceptible of detachment from the body 1, and that after the removal of the said side blades 9 some or all of the intermediate blades 9 may be removed through the open ends of the body 1. When all of the intermediate blades 9 are removed, and the side blades 7 are replaced and secured in position together with, say two, intermediate blades 9, the knife is adapted for use to advantage in expeditiously cutting at each operation a plurality of bread or meat portions of predetermined size. Again it will be observed that by using more or less of the intermediate blades 9 and arranging the said intermediate blades 9 at greater or less distances apart, the number and the thicknesses of the slices to be cut at each operation of the knife may be readily determined.

Notwithstanding the practical advantages ascribed to my novel knife, it will be noted that the knife is simple and strong in construction, and is susceptible of being readily and thoroughly cleaned.

Having described my invention, what I claim and desire to secure by Letters-Patent, is:

1. A multiple-blade knife comprising a body having forwardly reaching flanges and alined opposed flanges on the first-named flanges and also having a back wall in which is a plurality of apertures, a handle and a central blade fixed with respect to each other and the center of the body, side blades having lateral inwardly reaching lugs snugly fitting in the end portions of the body and also having lateral inwardly directed flanges lapped over the end portions of the body, screws detachably secured in said flanges and lugs of the side blades and the back wall of the body, intermediate blades having comparatively thick and heavy heel portions snugly fitting in the body and having notches receiving the opposed flanges of the body, and screws detachably secured in the back wall of the body and in threaded sockets in the said heel portions of the intermediate blades.

2. The combination in a multiple-blade knife, of a body having a back wall and opposed flanges spaced from said back wall, said body being open at its end, a blade having a lateral lug disposed in the open end of the body and also having notches receiving the body flanges and a flange lapped against the rear side of the body, and a screw extending through said flange, the back wall of the body and the lug and detachably connecting the side blade to the body.

In testimony whereof I affix my signature.

STEVEN F. HORVÁTH.